DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 8

T951,011

CELLULOSE ESTERS HAVING IMPROVED COMPATIBILITY PROPERTIES

Richard J. Brewer, 5633 Cochise Trail 37664, and Richard T. Bogan, 700 Thornwood Place 37660, both of Kingsport, Tenn.

Filed Dec. 15, 1975, Ser. No. 641,057

Int. Cl.[2] C08L *1/14*

U.S. Cl. 260—17 R

No Drawing. 3 Pages Specification

A composition comprising (1) cellulose butyrate phthalate having an acid number from about 50 to 105 and (2) a thermosetting acrylic or epoxy resin system, the weight ratio of (1) to (2) being between about 10 to 90 and 80 to 20. These esters are useful in wood furniture, automobiles, metal furniture, and appliance coatings, based on epoxy and thermosetting acrylic resins.